(12) United States Patent
Bouthillier et al.

(10) Patent No.: US 6,219,792 B1
(45) Date of Patent: Apr. 17, 2001

(54) SECURED NETWORK SYSTEM

(75) Inventors: Stephen W. Bouthillier, deceased, late of Ridgecrest, CA (US), by: Joan M. Bouthillier, legal representative; Ross E. Seybold; Kenneth D. Wesche, both of Ridgecrest, CA (US); Robert V. Sulkowski, Houston, PA (US); Brian L. Dodge, Toutle, WA (US); Dana C. Kellogg, Morgan Hill, CA (US); Randall Morse, Pittsburg, PA (US); Jim Pinnell, Trona, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/146,922

(22) Filed: Aug. 28, 1998

Related U.S. Application Data

(63) Continuation-in-part of application No. 09/035,409, filed on Feb. 10, 1998, and a continuation-in-part of application No. 08/919,181, filed on Aug. 15, 1997, now Pat. No. 5,841,120, and a continuation-in-part of application No. 08/919,180, filed on Aug. 15, 1997, now Pat. No. 5,894,552.

(51) Int. Cl.[7] .............................. G06F 11/30; H04L 9/00; H04L 9/32
(52) U.S. Cl. ........................ 713/201; 713/200; 713/202
(58) Field of Search .................................. 714/200, 201, 714/202

(56) References Cited

U.S. PATENT DOCUMENTS

| 3,818,190 | 6/1974 | Silverman et al. | 235/61.7 R |
|---|---|---|---|
| 4,703,163 | 10/1987 | Genest | 235/382 |
| 4,769,765 | 9/1988 | Green | 364/145 |
| 4,962,449 | 10/1990 | Schlesinger | 364/200 |
| 5,187,352 | 2/1993 | Blair et al. | 235/382 |
| 5,841,120 | * 11/1998 | Bouthillier et al. | 235/382 |
| 5,894,552 | * 4/1999 | Bouthillier et al. | 713/201 |
| 6,012,632 | * 1/2000 | Bouthillier et al. | 235/375 |
| 6,021,497 | * 2/2000 | Bouthillier et al. | 713/202 |
| 6,092,724 | * 7/2000 | Bouthillier et al. | 235/380 |

* cited by examiner

Primary Examiner—Ly V. Hua
(74) Attorney, Agent, or Firm—David Kalmbaugh

(57) ABSTRACT

A secured network system comprising a readykey controller which has a first card reader and a power relay switch connected thereto. The user of the system inserts a microchip embedded card into the first card reader which then transmits an authorization signal to the readykey controller. The readykey controller then activates a power relay switch affixed to the computer which connects the computer's power supply to an external power source activating the computer. The secured network system also has a data relay switch which includes a manual A/B secured network switch. The manual A/B switch allows the user to receive and process classified data, by setting the switch to a predetermined position which connects a secured network server to the computer. The user inserts his proximity card into a second card reader which transmits a second authorization signal to the readykey controller. The readykey controller, responsive to the second authorization signal, activates the data relay switch. Activating the data relay switch connects the secured network switch to the secured network server via the data relay switch which allows for the transmission of classified data between the secured network server and the personal computer.

11 Claims, 6 Drawing Sheets

SECURED NETWORK SYSTEM

This application is a continuation-in-part of U.S. patent application Ser. No. 09/035,409, filed Feb. 10, 1998, U.S. patent application Ser. No. 08/919,180, filed Aug. 15, 1997, now U.S. Pat. No. 5,894,552, and U.S. patent application Ser. No. 08/919,181, filed Aug. 15, 1997, U.S. Pat. No. 5,841,120.

BACKGROUND OF THE INVENTION

1. Field of the Invention

The present invention relates generally to secured network systems. More particularly, the present invention relates to a secured network system which allows multiple users with proper authorization to access classified data provided by a secured network server and unclassified data provided by an unsecured network server from their personal computer.

2. Description of the Prior Art

In the past computer security for the military services and the intelligence agencies has been provided by a variety of commercially available computer programs which are adapted for use with a variety of microcomputers such as DOS based operating system personal computers and Apple Macintosh personal computers. These computer programs are adapted to provide access control to a computer's data or the data base of a Local Area Network that is coupled to the computer.

Computer security programs often reside in the memory of the computer's central processing unit. Placing computer security programs in the computer's memory slows the computer's processing time because the computer must perform repetitive identification and auditing tasks stored in the computer's memory. In addition, conflicts between security software and the computer operating system or other computer software used by the computer may result in the computer crashing which renders the computer unusable.

Recently microchip embedded cards or "Smart Cards" have been used with computer security software to insure that classified data is not accessible to an individual who is not authorized to access the classified data. However, "Smart Cards" also rely on performing authentication and auditing functions which are stored in the computer's memory.

Accordingly, there is a need for a secure network system which will allow only authorized individuals to access classified data, but will not require the use of computer memory to perform authentication and auditing functions associated with the accessing of classified data.

SUMMARY OF THE INVENTION

The present invention overcomes some of the disadvantages of the prior art including those mentioned above in that it comprises a relatively simple yet highly effective secured network system which will allow only an authorized user of the secured network system to access classified data.

The secured network system comprising the present invention includes a readykey controller which has connected thereto a first card reader and a power relay switch. The user of the secured network system inserts a microchip embedded card into the first card reader which then transmits an authorization signal to the readykey controller indicating that the user is authorized to use a personal computer and its associated monitor. The readykey controller, in response to the authorization signal, activates a power relay switch affixed to the computer which connects the computer's power supply to an external power source allowing the user to receive and process data with the computer.

The secured network system also has a data relay switch which includes a manual A/B secured network switch. The manual A/B switch allows the user to receive and process classified data, by setting the manual A/B switch to a predetermined position which allows a secured network server to be connected to the computer. The user then inserts his proximity card into a second card reader which transmits a second authorization signal to the readykey controller indicating that the user is authorized to receive and process classified data from the secured network server. The readykey controller, responsive to the second authorization signal, activates the data relay switch. Activating the data relay switch connects the secured network switch to the secured network server via the data relay switch which allows for the transmission of classified data between the secured network server and the personal computer.

The secured network system of the present invention is adapted for use with two computers. A second power relay switch and a second data relay switch is provided for the second computer to allow an authorized user of the second computer to receive and processed both classified and unclassified data.

Each power relay switch has a tamper circuit which is connected to the readykey controller. When an unauthorized user attempts to bypass the power relay switch to gain access to the computer the impedance of the tamper circuit will change which causes the readykey controller to deactivate the power relay switch and generate an alarm.

Each data relay switch also has a tamper circuit which is connected to the readykey controller. When an unauthorized user attempts to bypass the data relay switch to gain access to the computer the impedance of the tamper circuit will change which causes the readykey controller to de-activate the data relay switch and generate an alarm.

DETAILED DESCRIPTION OF THE PREFERRED EMBODIMENT

Figure 1:
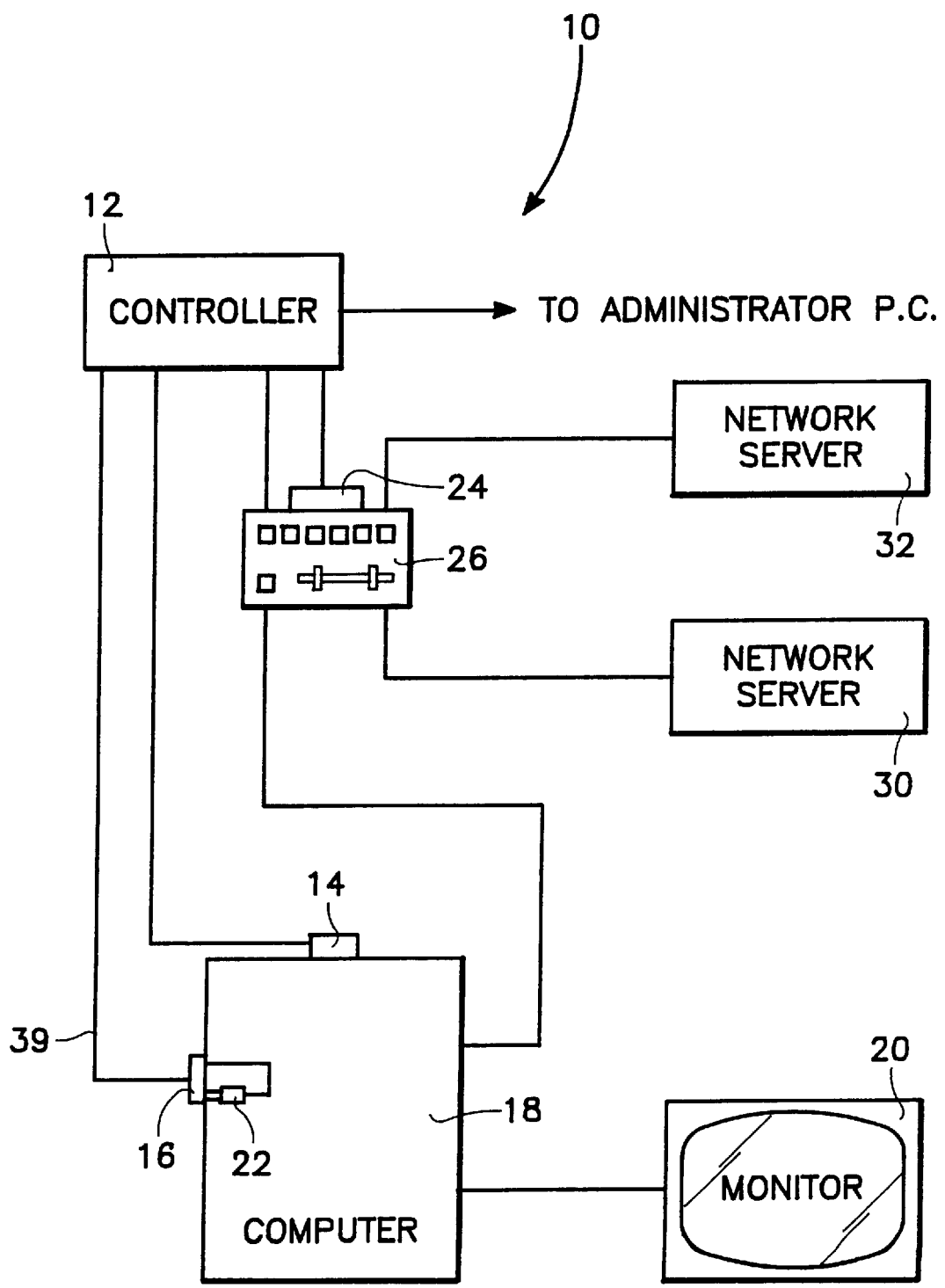
FIG. 1 is an electrical schematic diagram of a secured network system which includes a power relay switch and a data relay switch.

Referring to FIG. 1 there is shown a secured network system 10 which receives and processes classified data as well as unclassified data. Secured network system 10 includes a readykey controller 12 which has connected thereto a personal computer card reader 14 located adjacent a digital computer 18 and a power relay switch 16 affixed to computer 18. The user of secured network system 10 presents a proximity card which is a microchip embedded card (not illustrated) to card reader 14. Card reader 14 upon receiving the microchip embedded card and verifying the card transmits an electrical authorization signal to readykey controller 12 indicating that the user is authorized to use digital computer 18 and its associated monitor 20 for receiving and processing classified data as well as unclassified data.

The readykey controller 12 is also connected to an administrative personal computer (not illustrated) which monitors readykey controller 12 to keep track of individuals accessing computer 18 and to insure an attempt at unauthorized access of data stored in computer 18 or available to computer 18 through a Local Area Network is not made.

Referring now to FIGS. 1, 2 and 4A–4C, readykey controller 12 has four contacts RC1, RC2, RC3 and RC4. Readykey controller 12, in response to the electrical authorization signal from card reader 14, closes its contact RC1 which allows current from a +12 VDC source to flow through the coils of relays 40, 41 and 42 energizing the coil of each relay 40, 41 and 42. Energizing the coil of relay 40 closes normally open contact 1 of relay 40, energizing the coil of relay 41 closes normally open contact 1 of relay 41, and energizing the coil of relay 42 opens normally closed contact 1 of relay 42.

Closing contact 1 of relay 40 and relay 41 connects power line 44 from terminal M3 of power relay switch 16 through relay 40 to terminal M5 of switch 16 and neutral line 46 from terminal M4 of power relay switch 16 through relay 40 to terminal M6 of switch 16. Terminal M5 and M6 of power relay switch 16 are connected to the power supply for computer 18 so that closure of normally open contact 1 of relays 40 and 41 provides 120 VAC from an external source to the power supply of computer 18, thereby activating computer 18 which allows the user of computer 18 to receive and process data. Line 48 provides a ground for computer 18.

Line 50 which connects pin 6, terminal J1 of switch 16 to pin 5, terminal J1 of switch 16 via normally closed contact 1 of relay 42 is a status or test line. When normally closed contact 1 of relay 42 is closed a test signal is supplied to readykey controller 12 indicating that power relay switch 16 is off and computer 18 is not operational. Opening normally closed contact 1 of relay 42 results in a test signal being provided to readykey controller 12 which indicates that power relay switch 16 is on and computer 18 is operational.

Power relay switch 16 includes a normally closed tamper switch 22 which is connected through pins 7 and 8 of terminal J1 of switch 16 to readykey controller 12. When tamper switch 22 is in a closed position, current flow is through resistor R1 and switch 22 which indicates to readykey controller 12 that power relay switch 16 is operating normally. Unauthorized tampering or removal of the power relay switch 16 from computer 18 opens tamper switch 22. Opening tamper switch 22 results in a change in impedance (series connected resistors R1 and R2 are now in the current flow path) which indicates that an unauthorized person has attempted to bypass power relay switch 16 or remove power relay switch 16 from computer 18. Resistor R1 has a value of 2.2 K-ohms and resistor R2 has a value of 4.7 k-ohms.

Referring again to FIG. 1, secured network system 10 includes a data relay switch 26 which has a manual A/B switch enclosed therein. The manual A/B switch allows the user of computer 18 to receive unclassified data from an unsecured network server 30 and classified data from a secured network server 32. The manual A/B switch used in secured network system 10 is fully disclosed in U.S. Pat. No. 5,777,400, "Shielded Computer Network Switch", which issued on Jul. 7, 1998 to Stephen W. Bouthillier, a co-inventor of the present invention.

When the manual A/B switch of data relay switch 26 is set at a first position such that unsecured network server 30 is connected to computer 18, the user of computer 18 may receive and process unclassified data from unsecured network server 30.

When the user of secured network system 10 needs to receive and process classified data, the manual A/B switch of data relay switch 26 is set at a second position allowing secured network server 32 to be connected to computer 18. The user next inserts his proximity card into a network card reader 24 which then transmits an electrical authorization signal to readykey controller 12 indicating that the user is authorized to receive and process classified data from secured network server 32. Readykey controller 12, responsive to the authorization signal from network card reader 24 enables data relay switch 26. Enabling data relay switch 26 connects secured network server 32 to computer 18 through data relay switch 26 and the manual A/B switch enclosed therein.

Figure 3:
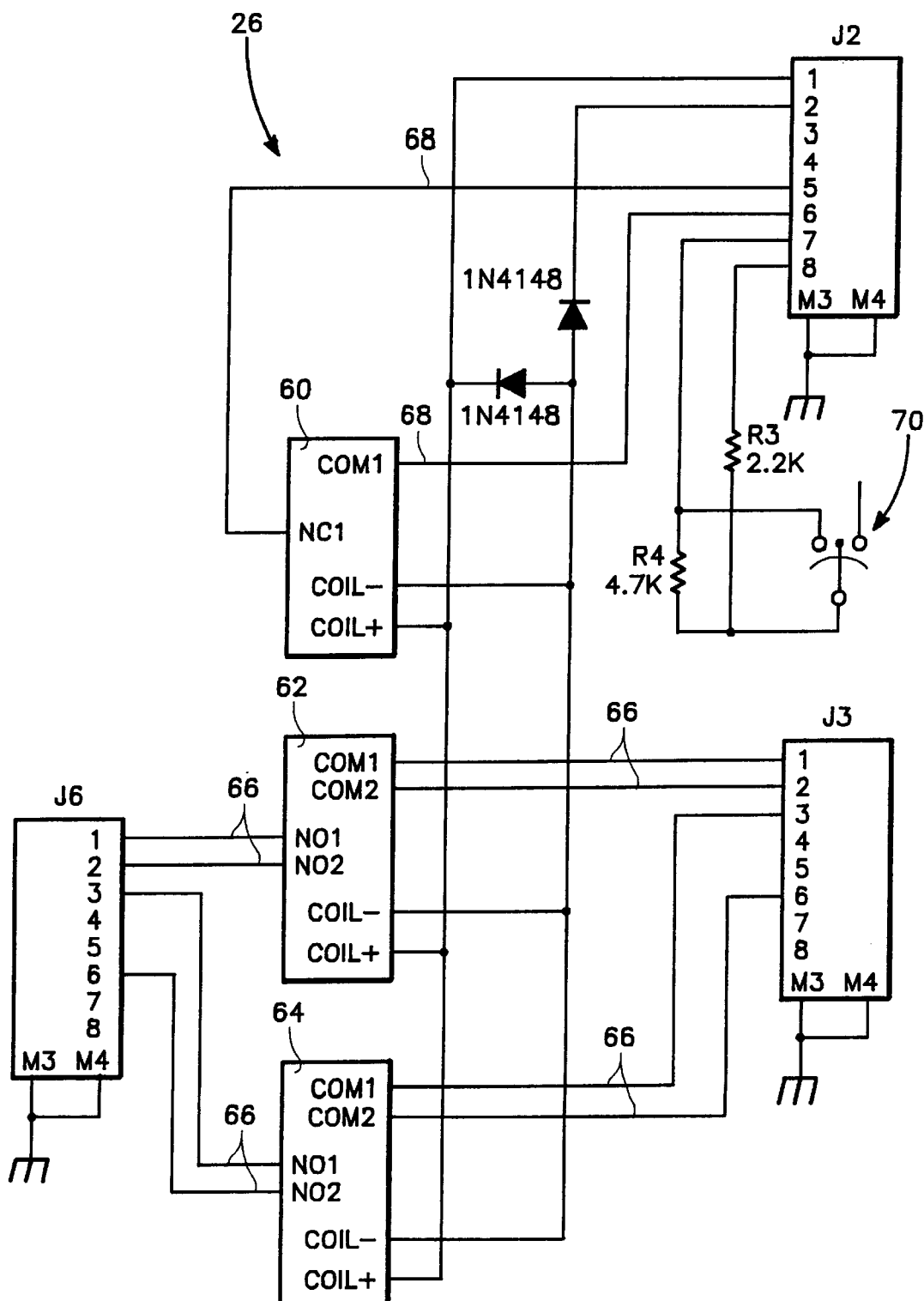
FIG. 3 is an electrical schematic diagram of the data relay switch of FIG. 1.
Figure 4A:
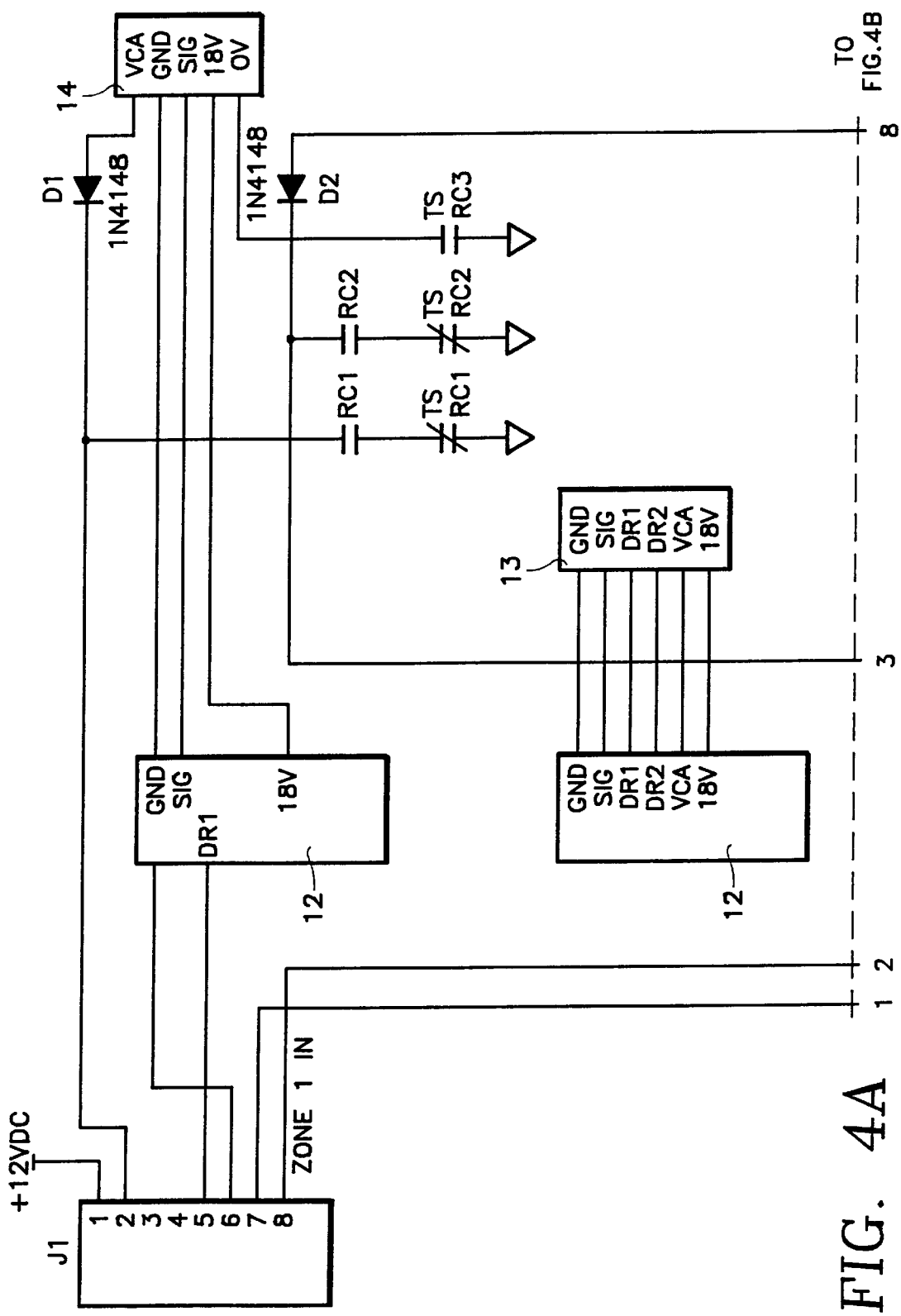
FIGS. 4A, 4B and 4C are electrical schematic diagrams of a secured network system which includes a power relay switch, a data relay switch and which is adapted for use with plurality of card readers.
Figure 4B:
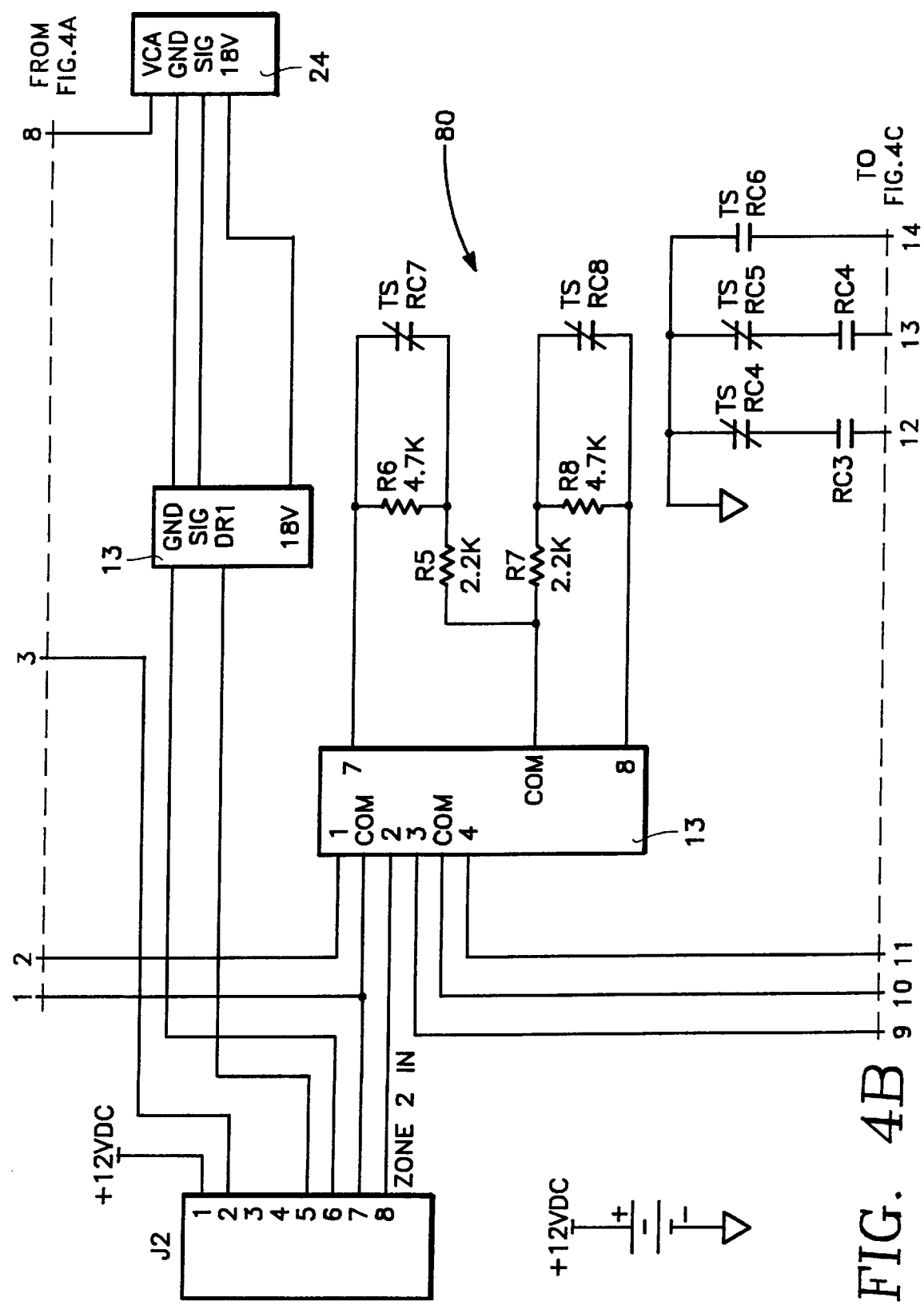
Figure 4C:
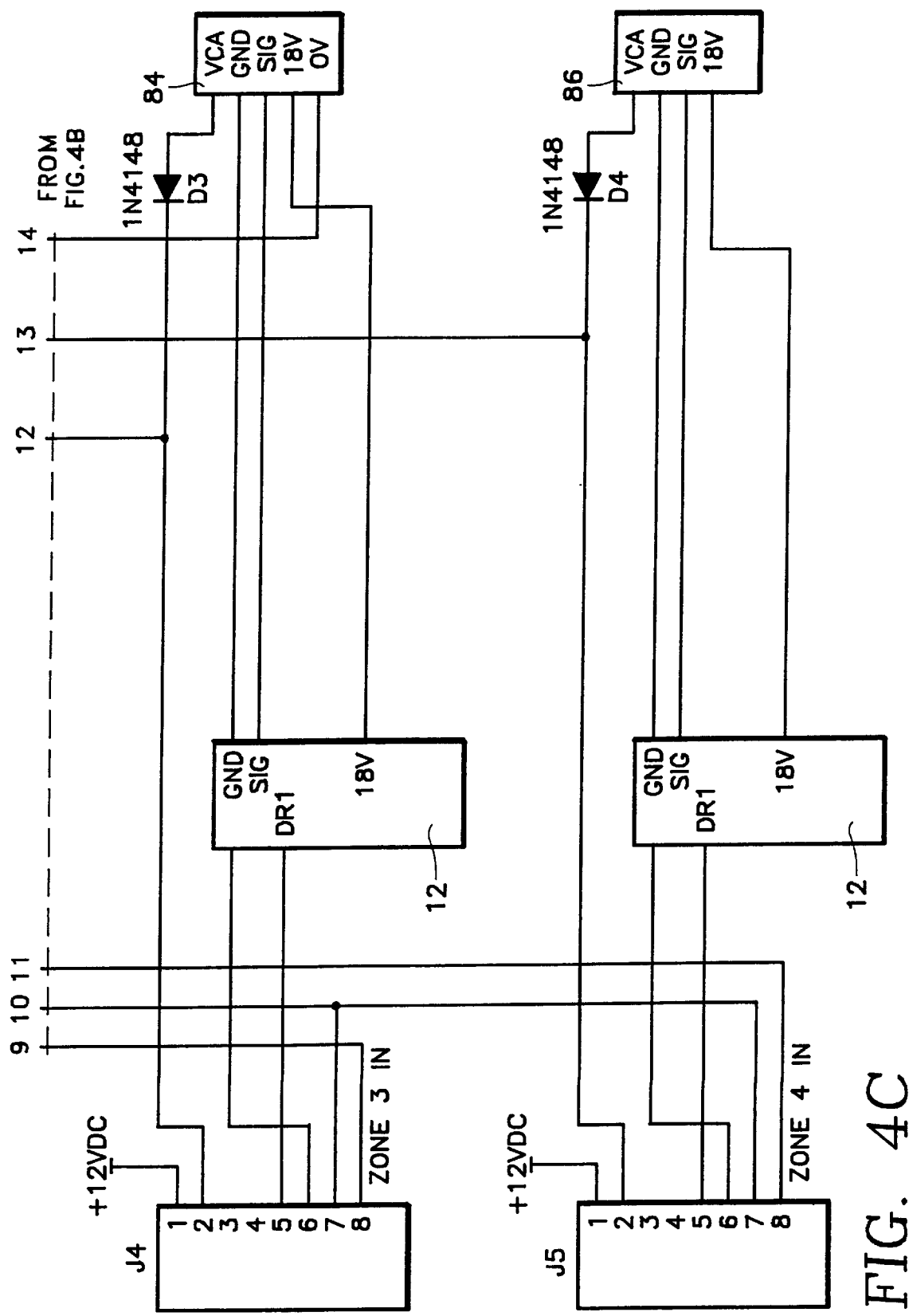

Referring to FIGS. 1, 3 and 4A–4C there is shown in FIG. 3 a detailed electrical schematic diagram of data relay switch 26. Data relay switch 26 includes three relays 60, 62 and 64 which allow a computer to be connected to secured network server 32.

Secured network server 32 is connected to computer 18 through relays 60, 62 and 64 of data relay switch 26. Readykey controller 12, in response to the electrical authorization signal from card reader 24, closes its contact RC2 which allows current from +12 VDC source to flow through the coils of relays 60, 62 and 64 energizing the coil of each relay 60, 62 and 64. Energizing the coil of relay 62 closes normally open contacts 1 and 2 of relay 62, energizing the coil of relay 64 closes normally open contacts 1 and 2 of relay 64, and energizing the coil of relay 60 opens normally closed contact 1 of relay 60. Closing the normally open contacts 1 and 2 of each relay 62 and 64 completes a data path for the four classified data lines 66 between secured network server 32 and computer 18 allowing for the transfer of classified data between secured network server 32 and computer 18.

Data relay switch 26 also has a status or test line 68 which indicates the status of the data path or the four data lines 66 between secured network server 32 and computer 18. When the coil of relay 60 is de-energized, normally closed contact 1 of relay 60 is closed sending a test signal to readykey controller 12 via status line 68 which indicates to readykey controller 12 that the data path between secured network server 32 and computer 18 is inactive. Energizing the coil of relay 60 opens normally closed contact 1 of relay 60 which indicates to readykey controller 12 that the data path between secured network server 32 and computer 18 is active and classified data may be transferred over the four data lines 66.

Data relay switch 26 also has a normally closed tamper switch 70 which is connected through pins 7 and 8 of terminal J2 of data relay switch 26 to readykey controller 12. When tamper switch 70 is in a closed position, current flow is through resistor R3 and switch 70 which indicates to readykey controller 12 that data relay switch 26 coupled to computer 18 is operating normally. Unauthorized tampering of data relay switch 26 opens tamper switch 70. Opening tamper switch 70 results in a change in impedance (series connected resistors R3 and R4 are now in the current flow path) which indicates that an unauthorized person has tampered with data relay switch 26. Resistor R3 has a value of 2.2 K-ohms and resistor R4 has a value of 4.7 k-ohms.

At this time it should be noted that readykey controller 12 includes an alarm event manager module 13 which significantly increases the inputs and outputs of readykey controller 12. The readykey controller 12 used in the preferred embodiment of the present invention is a Model No. K2100 Readykey Controller commercially available from Radionics Corporation of Salinas, Calif. Module 13 is a Model K2015A Alarm Event Manager Module also commercially available from Radionics Corporation. Personal Computer card reader 14 is a Readykey K2003 Touchfree proximity reader and network card reader 24 is a Readykey K2001 Touchfree proximity reader also commercially available from Radionics of Salinas, Calif.

The power relay switch 16 used in the preferred embodiment of the present invention is a Model No. 101022 SecureSwitch Power Relay Switch commercially available from Market Central Inc. of Pittsburgh, Pa. The data relay switch 26 which has a manual A/B switch enclosed therein is a Model No. 101021 SecureSwitch Data Relay Switch, also commercially available from Market Central, Inc.

Referring to FIGS. 1, 2 and 4A–4C, whenever an unauthorized person tampers with power relay switch 16, module 13 of readykey controller 12 will sense a change in impedance within the R1, R2 resistor series circuit of switch 16 via a ZONE 1 IN line. ZONE 1 IN line connects module 13 to power relay switch 16 of secured network system 10.

Readykey controller has six normally closed tamper switch relay contacts TSRC1, TSRC2, TSRC4, TSRC5, TSRC7 and TSRC8 and two normally open tamper switch relay contacts TSRC3 and TSRC6.

Readykey controller 12, responsive to this change in impedance, opens its normally closed contact TSRC1 which deenergizes relays 40 and 41 of power relay switch 16. Deenergizing relays 40 and 41 opens contact 1 of relay 40 and contact 1 of relay 42 which disconnects 120 VAC from the external source to the power supply of computer 18 deactivating computer 18.

Referring to FIGS. 1, 3 and 4A–4C, whenever an unauthorized person tampers with data relay switch 26, module 13 of readykey controller 12 will sense a change in impedance within the R3, R4 resistor series circuit of switch 26 via a ZONE 2 IN line. ZONE 2 IN line connects module 13 to data relay switch 26 of secured network system 10.

Readykey controller 12, responsive to this change in impedance, opens its normally closed contact TSRC2 which deenergizes relays 62 and 64 of data relay switch 26. Deenergizing relays 62 and 64 opens contacts 1 and 2 of relay 62 and contacts 1 and 2 of relay 64 which disconnects the four classified data lines 66 between secured network server 32 and computer 18. Disconnecting the four classified data lines 66 prevents the transfer of classified data between secured network server 32 and computer 18.

Opening contact TSRC2 also de-energizes relay 60 closing contact 1 of relay 60 which results in a test signal being sent to readykey controller 12 via status line 68 indicating to readykey controller 12 that the data path between secured network server 32 and computer 18 is now inactive.

Module 13 of readykey controller 12 also has an impedance matching circuit 80. Impedance matching circuit 80 includes series connected resistor R5 and R6 and readykey controller contact TSRC7 which is connected parallel to resistor R6. Impedance matching circuit 80 also includes series connected resistor R7 and R8 and readykey controller contact TSRC8 which is connected parallel to resistor R8. Resistors R5 and R7 each have a value of 2.2 K-ohms while resistors R6 and R8 each have a value of 4.7 K-ohms.

Impedance matching circuit 80 is used by readykey controller 12 as a comparison circuit to compare the impedance values provided by power relay switch 16 and data relay switch 26 with the expected values provided by impedance matching circuit 80. Readykey controller 12 may then determine whether an unauthorized person is tampering with either power relay switch 16 or data relay switch 26.

Each card reader 14, 24, 84 and 86 has red and green light emitting diodes (not illustrated). The red light emitting diode indicates the card reader 14, 24, 84 or 86 is powered on but authorized access has not been granted.

The VCA terminal of card reader 24 is connected through diode D2, contact RC2 and contact TSRC2 to ground. When readykey controller 12 closes contact RC2 the current path from card reader 24 to ground is complete which activates the green light emitting diode of card reader 24. Activating the green light emitting diode of card reader 24 indicates that data channel associated with card reader 24 is enabled.

Referring to FIGS. 1 and 4A–4C, secured network system 10 is adapted for use with two personal computers. System 10 includes a second personal computer card reader 84 located adjacent the second personal computer (not illustrated). System 10 also includes a second network card reader 86 positioned adjacent the data relay switch for the second computer.

The user of secured network system 10 may present a proximity card to card reader 84. When card reader 84 verifies that the user is authorized to use the second computer and the monitor associated with card reader 84, readykey controller 12 will activate the power relay switch for the second computer. In a like manner, the data relay switch for the second computer is activated when an authorized user presents a proximity card to card reader 86 which allows the user of the second computer to receive and process classified data as well as unclassified data.

Figure 2:
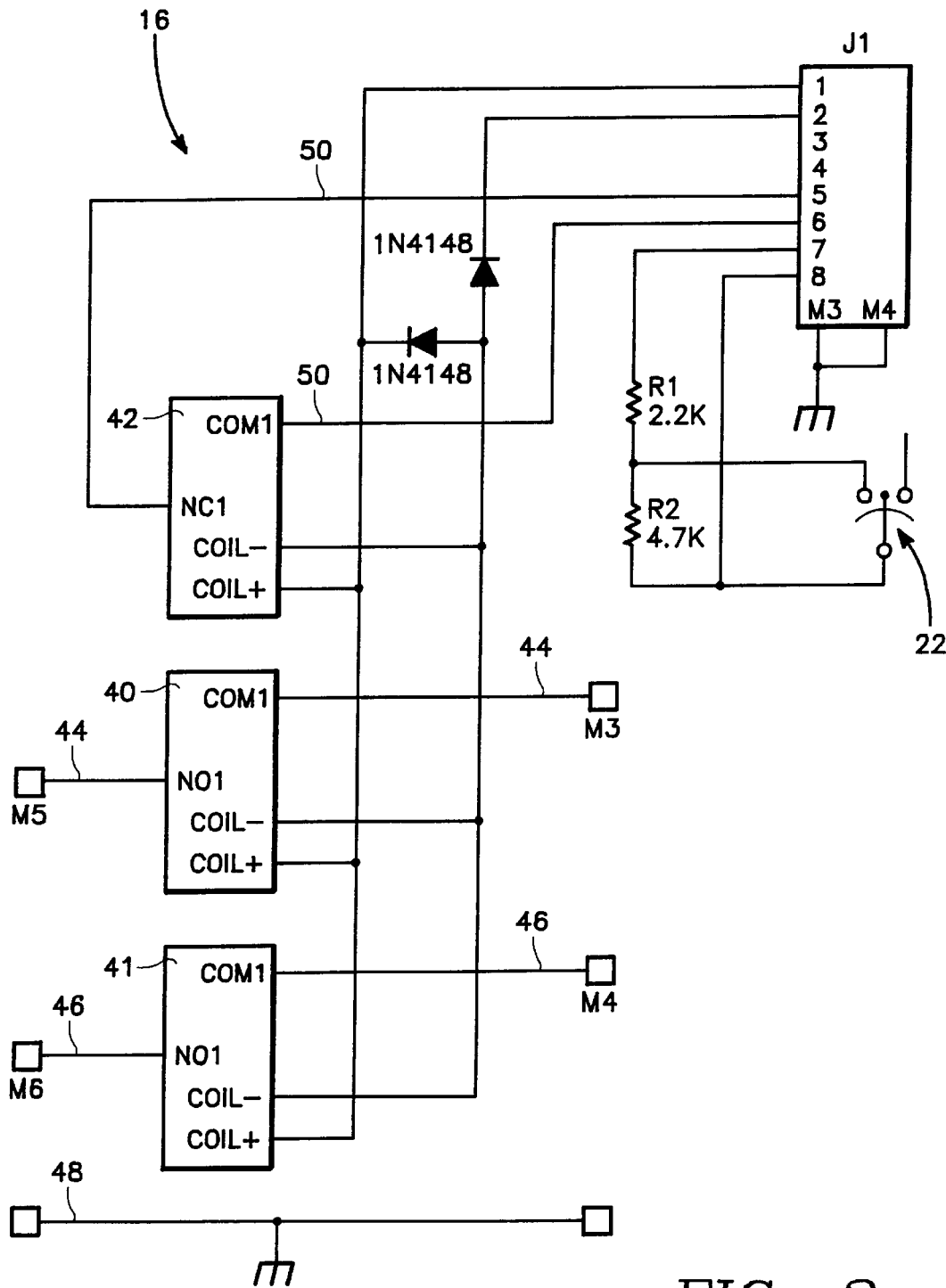
FIG. 2 is an electrical schematic diagram of the power relay switch of FIG. 1.

Since the power relay switch for the second personal computer operates in exactly the same manner as the power relay switch illustrated in FIG. 2, and the data relay switch for the second personal computer operates in exactly the same manner as the data relay switch illustrated in FIG. 3, a detailed description of their operation will not be provided.

From the foregoing, it may readily be seen that the present invention comprises a new, unique and exceedingly useful secured network system for receiving and processing classified and unclassified data which constitutes a considerable improvement over the known prior art. Obviously, many modifications and variations of the present invention are possible in light of the above teachings. It is, therefore to be understood that within the scope of the appended claims that the invention may be practiced otherwise than as specifically described.

What is claimed is:

1. A secured network system comprising:

a first data processor for receiving and processing classified data;

a second data processor for receiving and processing said classified data;

a first personal computer card reader located in proximity to said first data processor;

a second personal computer for receiving and processing said classified data;

said first personal computer card reader being adapted to receive a microchip embedded card, said first personal computer card reader providing a first authorization signal whenever said microchip embedded card is presented to and authenticated by said personal computer card reader;

said second personal computer card reader being adapted to receive said microchip embedded card, said second personal computer card reader providing a second authorization signal whenever said microchip embedded card is presented to and authenticated by said second personal computer card reader;

a first power relay switch connected to said first data processor;

a second power relay switch connected to said second data processor;

a controller connected to said first power relay switch and said second power relay switch, said controller being connected to said first personal computer card reader to receive said first authorization signal from said personal computer card reader, said controller being connected to said second personal computer card reader to receive said second authorization signal from said personal computer card reader;

said controller, responsive to said first authorization signal, activating said first power relay switch, said power relay switch when activated coupling said first data processor to an external power supply to enable said first data processor allowing said first data processor to receive and process said classified data;

said controller, responsive to said second authorization signal, activating said second power relay switch, said second power relay switch when activated coupling said second data processor to said external power supply to enable said second data processor allowing said second data processor to receive and process said classified data;

said first power relay switch having a normally closed tamper switch coupled to said first data processor and said controller;

said controller monitoring the normally closed tamper switch of said first power relay switch to detect when the normally closed tamper switch of said first power relay switch is opened which indicates that an unauthorized user of said secured network system is attempting to bypass said first power relay switch;

said second power relay switch having a normally closed tamper switch coupled to said second data processor and said controller;

said controller monitoring the normally closed tamper switch of said second power relay switch to detect when the normally closed tamper switch of said second power relay switch is opened which indicates that said unauthorized user of said secured network system is attempting to bypass said second power relay switch;

a first data relay switch connected to said first data processor, said first data relay switch being connected to a classified network server which generates said classified data;

a first network card reader connected to said controller, said first network card reader being adapted to receive said microchip embedded card, said first network card reader providing a third authorization signal whenever said microchip embedded card is presented to and authenticated by said first network card reader;

said controller receiving said third authorization signal from said network card reader, said controller, responsive to said third authorization signal, enabling said first data relay switch to provide for a first data transfer of said classified data from said classified network server through said first data relay switch to said first data processor allowing an authorized user of said secure network system to process said classified data with said first data processor;

a second data relay switch connected to said second data processor, said second data relay switch being connected to said classified network server;

a second network card reader connected to said controller, said second network card reader being adapted to receive said microchip embedded card, said second network card reader providing a fourth authorization signal whenever said microchip embedded card is presented to and authenticated by said second network card reader;

said controller receiving said fourth authorization signal from said second network card reader, said controller, responsive to said fourth authorization signal, enabling said second data relay switch to provide for a second data transfer of said classified data from said classified network server through said second data relay switch to said second data processor allowing said authorized user of said secure network system to process said classified data with said second data processor;

said first data relay switch including a normally closed tamper switch connected to said controller;

said controller monitoring the normally closed tamper switch of said first data relay switch to detect when the normally closed tamper switch of said first data relay switch is opened which indicates that said unauthorized user of said secured network system is attempting to bypass said first data relay switch;

said second data relay switch including a normally closed tamper switch connected to said controller; and said controller monitoring the normally closed tamper switch of said second data relay switch to detect when the normally closed tamper switch of said second data relay switch is opened which indicates that said unauthorized user of said secured network system is attempting to bypass said second data relay switch.

2. The secured network system of claim 1 wherein said first data processor and said second data processor each comprise a digital computer.

3. The secured network system of claim 1 wherein said first power relay switch comprises:

a first relay having a coil connected to said controller and a normally open contact, the normally open contact of the first relay of said first power relay switch having a first terminal connected to said external power supply and a second terminal connected to said first data processor;

a second relay having a coil connected to said controller and a normally open contact, the normally open contact of the second relay of said first power relay switch having a first terminal connected to said external power supply and a second terminal connected to said first data processor;

a third relay having a coil and a normally closed contact, the coil of the third relay and the normally closed contact of the third relay of said first power relay switch being connected to said controller; and said controller, responsive to said first authorization signal, energizing the coil of the first relay, the coil of the second relay and the coil of the third relay of said first power relay switch to close the normally open contact of the first relay, the normally open contact of the second relay and close the normally open contact of the third relay of said first power relay switch.

4. The secured network system of claim 3 wherein said second power relay switch comprises:

a first relay having a coil connected to said controller and a normally open contact, the normally open contact of the first relay of said second power relay switch having a first terminal connected to said external power supply and a second terminal connected to said second data processor;

a second relay having a coil connected to said controller and a normally open contact, the normally open contact of the second relay of said second power relay switch having a first terminal connected to said external power supply and a second terminal connected to said second data processor;

a third relay having a coil and a normally closed contact, the coil of the third relay and the normally closed contact of the third relay of said second power relay switch being connected to said controller; and said controller, responsive to said second authorization signal, energizing the coil of the first relay, the coil of the second relay and the coil of the third relay of said second power relay switch to close the normally open contact of the first relay, the normally open contact of the second relay and close the normally open contact of the third relay of said second power relay switch.

5. The secured network system of claim 4 further comprising:

a first resistor having a first terminal connected to said controller and a second terminal connected to a first terminal of the normally closed tamper switch of said first power relay switch;

a second resistor having a first terminal connected to the second terminal of said first resistor and a second terminal connected to a second terminal of the normally closed tamper switch of said first power relay switch;

the second terminal of the normally closed tamper switch of said first power relay switch being connected to said controller;

a third resistor having a first terminal connected to said controller and a second terminal connected to a first terminal of the normally closed tamper switch of said second power relay switch;

a fourth resistor having a first terminal connected to the second terminal of said third resistor and a second terminal connected to the second terminal of the normally closed tamper switch of said second power relay switch; and the second terminal of the normally closed tamper switch of said second power relay switch being connected to said controller.

6. The secured network system of claim 5 wherein said first resistor comprises a 2.2 k-ohm resistor, said second resistor comprises a 4.7 k-ohm resistor, said third resistor comprises a 2.2 k-ohm resistor and said fourth resistor comprises a 4.7 k-ohm resistor.

7. The secured network system of claim 1 wherein said first data relay switch and said second data relay switch each include a manual A/B switch connected to said classified network server and an unclassified network server, said manual A/B switch of each of said first and said second data relay switches allowing said authorized user of said secured network system to access unclassified data provided by said unclassified network server and said classified data provided by said classified network server.

8. The secured network system of claim 1 wherein said first data relay switch comprises:

a first relay having a coil and a pair of normally open contacts, the coil of the first relay of said first data relay switch being connected to said controller, the pair of normally open contacts of the first relay of said first data relay switch being connected to said classified network server and said first data processor;

a second relay having a coil and a pair of normally open contacts, the coil of the second relay of said first data relay switch being connected to said controller, the pair of normally open contacts of the second relay of said data relay switch being connected to said classified network server and said first data processor;

a third relay having a coil and a normally closed contact, the coil and the normally closed contact of the third relay of said first data relay switch being connected to said controller;

said controller, responsive to said third authorization signal, energizing the coil of the first relay and the coil of the second relay and the coil of the third relay of said first data relay switch closing the pair of normally open contacts of the first relay and the pair of normally contacts of the second relay of said first data relay switch to provide a first classified data path between said classified network server and said first data processor; and said controller, responsive to said third authorization signal, energizing the coil of the third relay of said first data relay switch to close the normally open contact of the third relay of said first data relay switch.

9. The secured network system of claim 8 wherein said second data relay switch comprises:

a first relay having a coil and a pair of normally open contacts, the coil of the first relay of said second data relay switch being connected to said controller, the pair of normally open contacts of the first relay of said second data relay switch being connected to said classified network server and said second data processor;

a second relay having a coil and a pair of normally open contacts, the coil of the second relay of said second data relay switch being connected to said controller, the pair of normally open contacts of the second relay of said data relay switch being connected to said classified network server and said second data processor;

a third relay having a coil and a normally closed contact, the coil and the normally closed contact of the third relay of said second data relay switch being connected to said controller;

said controller, responsive to said fourth authorization signal, energizing the coil of the first relay and the coil of the second relay and the coil of the third relay of said second data relay switch closing the pair of normally open contacts of the first relay and the pair of normally contacts of the second relay of said second data relay switch to provide a first classified data path between said classified network server and said second data processor; and said controller, responsive to said fourth authorization signal, energizing the coil of the third relay of said second data relay switch to close the normally open contact of the third relay of said second data relay switch.

10. The secured network system of claim 9 further comprising:

a first resistor having a first terminal connected to said controller and a second terminal connected to a first terminal of the normally closed tamper switch of said first data relay switch;

a second resistor having a first terminal connected to the second terminal of said first resistor and a second terminal connected to a second terminal of the normally closed tamper switch of said first power relay switch;

the second terminal of the normally closed tamper switch of said first data relay switch being connected to said controller;

a third resistor having a first terminal connected to said controller and a second terminal connected to a first terminal of the normally closed tamper switch of said second data relay switch;

a fourth resistor having a first terminal connected to the second terminal of said third resistor and a second terminal connected to a second terminal of the normally closed tamper switch of said second data relay switch; and the second terminal of the normally closed tamper switch of said second data relay switch being connected to said controller.

11. The secured network system of claim 10 wherein said first resistor comprises a 2.2 k-ohm resistor, said second resistor comprises a 4.7 k-ohm resistor, said third resistor comprises a 2.2 k-ohm resistor and said fourth resistor comprises a 4.7 k-ohm resistor.

* * * * *